US007543526B1

(12) United States Patent
Tai

(10) Patent No.: US 7,543,526 B1
(45) Date of Patent: Jun. 9, 2009

(54) COFFEE MAKER

(76) Inventor: Yuen Wa Tai, Flat B, 8/F., Block 19 City One, Shatin (HK)

( * ) Notice: Subject to any disclaimer, the term of this patent is extended or adjusted under 35 U.S.C. 154(b) by 489 days.

(21) Appl. No.: 11/159,373

(22) Filed: Jun. 22, 2005

(51) Int. Cl.
*A47J 31/40* (2006.01)
(52) U.S. Cl. .............................. 99/284; 99/300; 99/299
(58) Field of Classification Search .................. 99/284, 99/295, 299, 305, 307, 302 R, 300
See application file for complete search history.

(56) References Cited

U.S. PATENT DOCUMENTS

| | | | | |
|---|---|---|---|---|
| 4,966,070 | A | * | 10/1990 | Frisch ....................... 99/302 R |
| 5,072,660 | A | * | 12/1991 | Helbling ...................... 99/280 |
| 6,009,792 | A | | 1/2000 | Kraan |
| 6,021,705 | A | | 2/2000 | Dijs |
| 6,026,993 | A | | 2/2000 | Sperna Welland |
| 6,748,850 | B1 | | 6/2004 | Kraan |
| 6,971,304 | B1 | * | 12/2005 | Lin ............................. 99/295 |
| 2003/0066431 | A1 | | 4/2003 | Fanzutti |
| 2005/0098043 | A1 | | 5/2005 | Bruinsma |
| 2006/0090653 | A1 | * | 5/2006 | McDuffie et al. ............. 99/279 |
| 2007/0137493 | A1 | * | 6/2007 | Van Der Meer et al. ....... 99/279 |
| 2007/0193450 | A1 | * | 8/2007 | Magg et al. ................... 99/279 |

* cited by examiner

*Primary Examiner*—Reginald L Alexander

(57) ABSTRACT

A coffee maker having a housing having a brewing chamber in which coffee is produced, a water reservoir attached to the housing, a system to pump water from the reservoir, heat the water and then deliver the heated water to the brewing chamber, and an adjustable spout removably and movably secured to the housing for receiving the coffee produced in the brewing chamber wherein the adjustable spout is moveable upward and downward. The coffee maker also has a lid that is moveable attached to the housing. The lid is moveable between a closed position that provides a sealed brewing chamber and an open position that allows access to the coffee pod holder and the coffee pod therein. The coffee maker has a pressure valve that routes excess pressurized water back to the reservoir.

16 Claims, 21 Drawing Sheets

COFFEE MAKER

BACKGROUND OF THE INVENTION

1. Field of the Invention

The present invention generally relates to coffee makers and in particular, coffee makers that utilize coffee pods.

2. Description of the Related Art

Coffee makers that use coffee pods are known in the art and are described in U.S. Pat. Nos. 6,009,792 and 6,748,850 and U.S. Patent Application Publication No. 2003/0066431. As is illustrated by these aforesaid patents, pods containing ground coffee are inserted into the coffee maker. Heated water is provided to the coffee pods in order to produce one or more cups of coffee.

SUMMARY OF THE INVENTION

The present invention is directed to a new and improved coffee maker that utilizes coffee pods. In one embodiment, the coffee maker comprises a housing having a brewing chamber in which coffee is produced, a water reservoir attached to the housing, a system to pump water from the reservoir, heat the water and then deliver the heated water to the brewing chamber, and an adjustable spout that is removably and movably secured to the housing for receiving the coffee produced in the brewing chamber. The adjustable spout is moveable upward and downward to accommodate coffee cups of different sizes.

The housing of the coffee maker has a funnel receiving space that is sized for receiving a coffee funnel. The coffee maker further comprises a coffee funnel positioned in the funnel receiving space, and a coffee pod holder removably positioned on the coffee funnel and sized to receive at least one coffee pod.

The coffee maker further comprises a lid moveably attached to the housing for covering the funnel receiving space, the coffee funnel, the coffee pod holder and coffee pod therein so as to provide a brewing chamber. The lid is moveable between a closed position that provides a seal around the periphery of the funnel receiving space so as to provide a sealed brewing chamber and an open position that allows access to the coffee funnel, the coffee pod holder and coffee pod therein.

The lid includes a corresponding lid locking device that, when in a first position, firmly locks the lid to the housing so as to create the sealed brewing chamber, and when in a second position, releases the lid from the locked position to allow the lid to be opened to allow insertion or removal of a coffee pod and/or coffee pod holder.

An advantage of the coffee maker of the present invention is that the lid locking device is solid and sturdy and provides a high-integrity, sealed brewing chamber.

An important feature of the coffee maker of the present invention is that the spout may be adjusted in position in order to accommodate coffee cups of various sizes. The spout has a handle that allows the user to easily move the spout up or down.

Another important feature of the coffee maker of the present invention is that it does not use a boiler to heat water as is done in some prior art coffee makers. Instead, the coffee maker of the present invention utilizes aluminum heater elements. It has been found that fabricating the heater elements from aluminum provides a heater element that has significantly improved heating efficiency in comparison to prior art stainless steel heating elements. Another advantage of the aluminum heater elements is that such heaters are relatively less expensive than stainless steel heater elements. A further advantage is that these aluminum heater elements have a quick preheating time period. Thus, these aluminum heater elements can be preheated in an amount of time that is less than the amount of time needed to preheat prior art stainless steel heater elements.

In one embodiment, the coffee maker includes a pressure valve to route excess pressurized water back to the reservoir.

Other objects, features and advantages of the present invention will be apparent from the ensuing description.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DESCRIPTION OF THE PREFERRED EMBODIMENTS

The ensuing description makes reference to FIGS. 1-21 of the drawings. The drawings are not drawn to scale.

Figure 1:
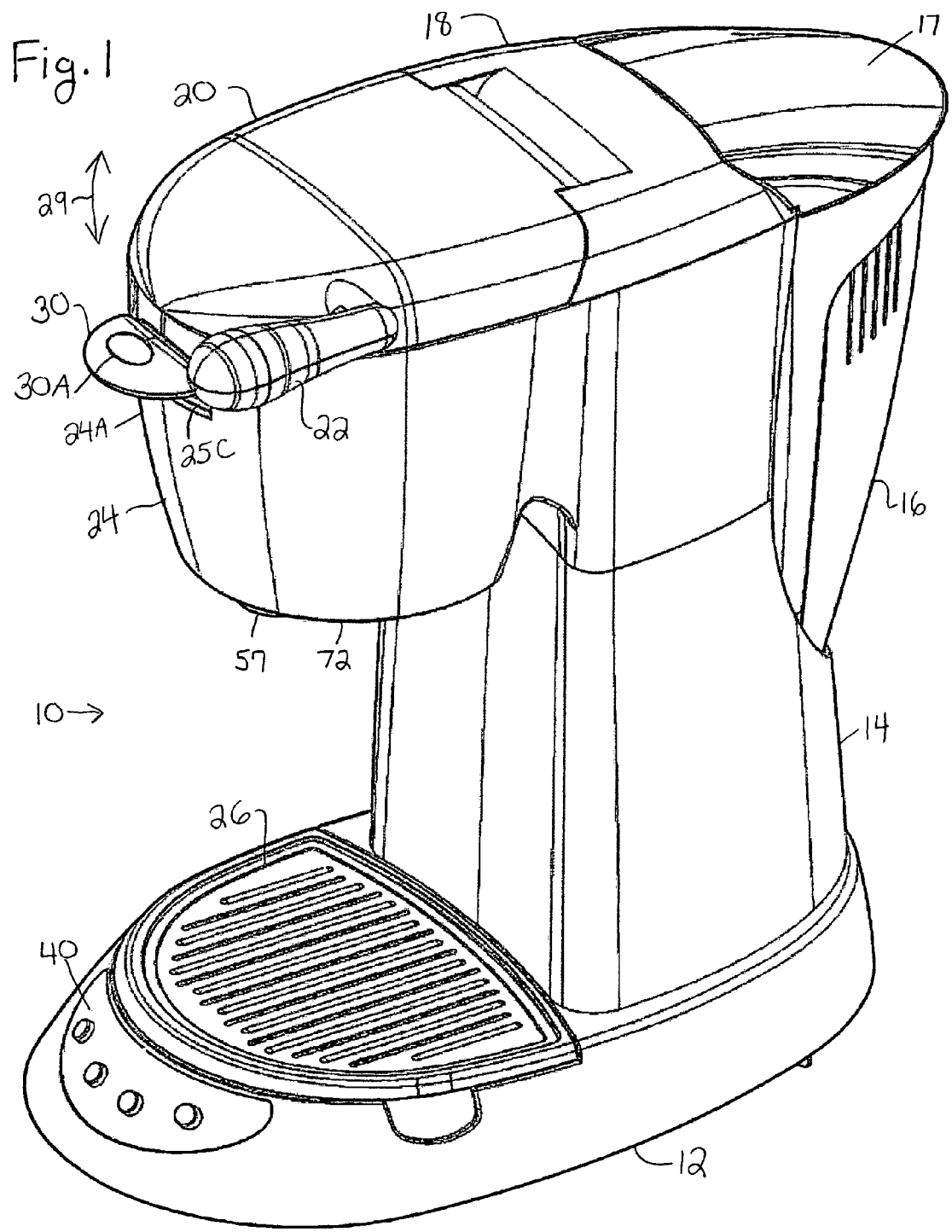
FIG. 1 is a perspective view of a coffee maker of the present invention.

Referring to FIG. 1, there is shown coffee maker 10 in accordance with one embodiment of the present invention. Coffee maker 10 generally comprises base 12, housing 14, water tank 16, water tank cover 17, housing cover 18, lid 20 and handle 22. Housing 14 includes front housing section 24 in which the hot coffee is made. Front housing section 24 has an upper portion 24A. This feature is described in the ensuing description. Handle 22 cooperates with a lid locking device to lock lid 20 to front housing section 24 and to release and open lid 20. Thus, lid 20 can move in the directions indicated by arrow 29. Once lid 20 is opened, a user will have access to coffee pod holder 30 and the coffee pod therein. The handle 30A of coffee pod holder 30 extends from front housing section 24 as shown in FIG. 1. Coffee maker 10 further includes drip tray cover 26 which covers drip tray 27. Drip tray 27 is disposed in drip tray recess 28 in base 12 (see FIGS. 4 and 5). Coffee pod holder 30 is removably positioned in front housing section 24 as will be described in the ensuing description. Control panel 40 is located on base 12. Control panel 40 is connected to electronic control circuit 604 (see FIG. 5) and wiring (not shown, but known in the art) that are located in base 12 and which control the functions of coffee maker 10.

Figure 2:
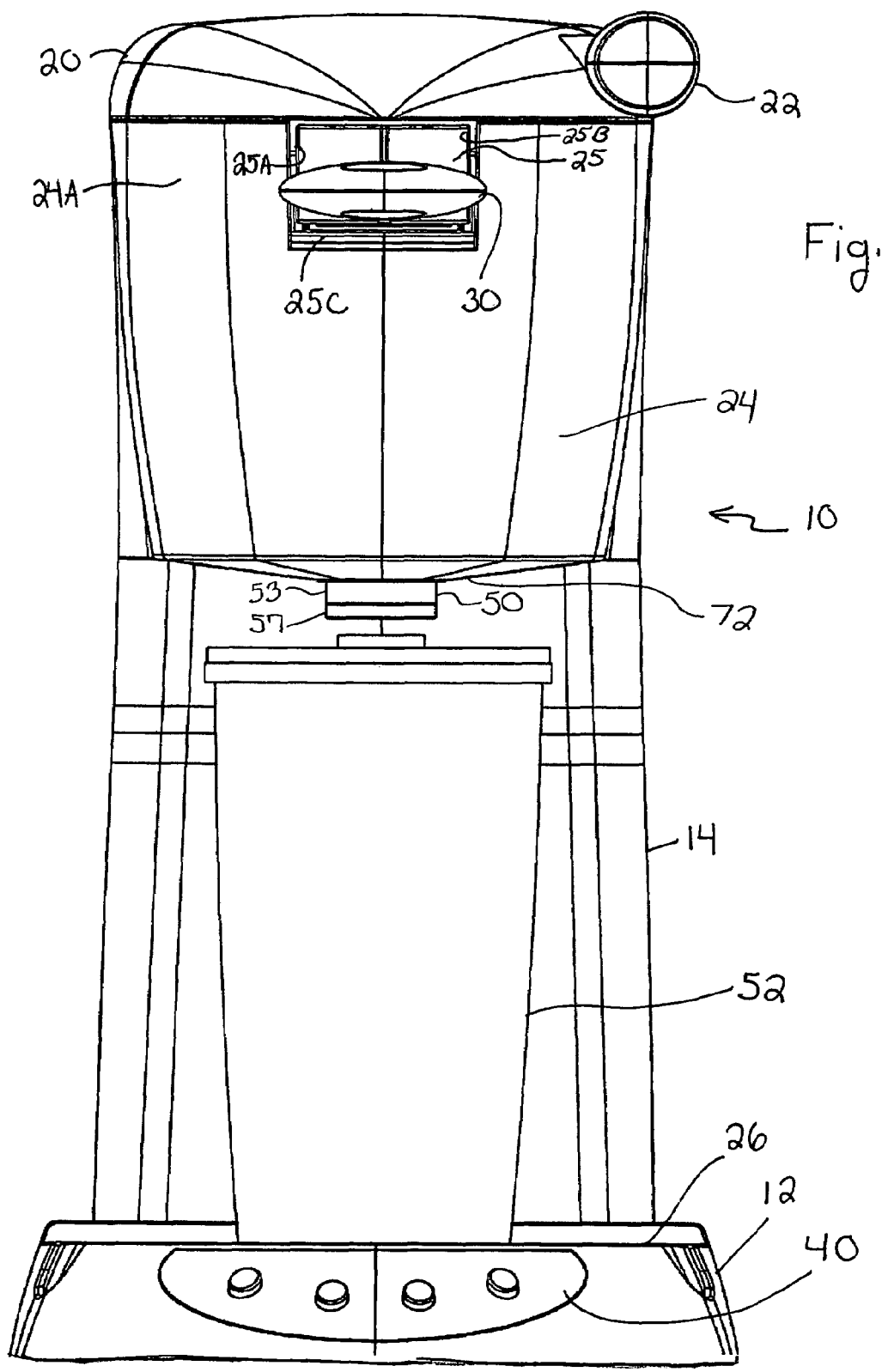
FIG. 2 is a front view of the coffee maker of FIG. 1.
Figure 3:
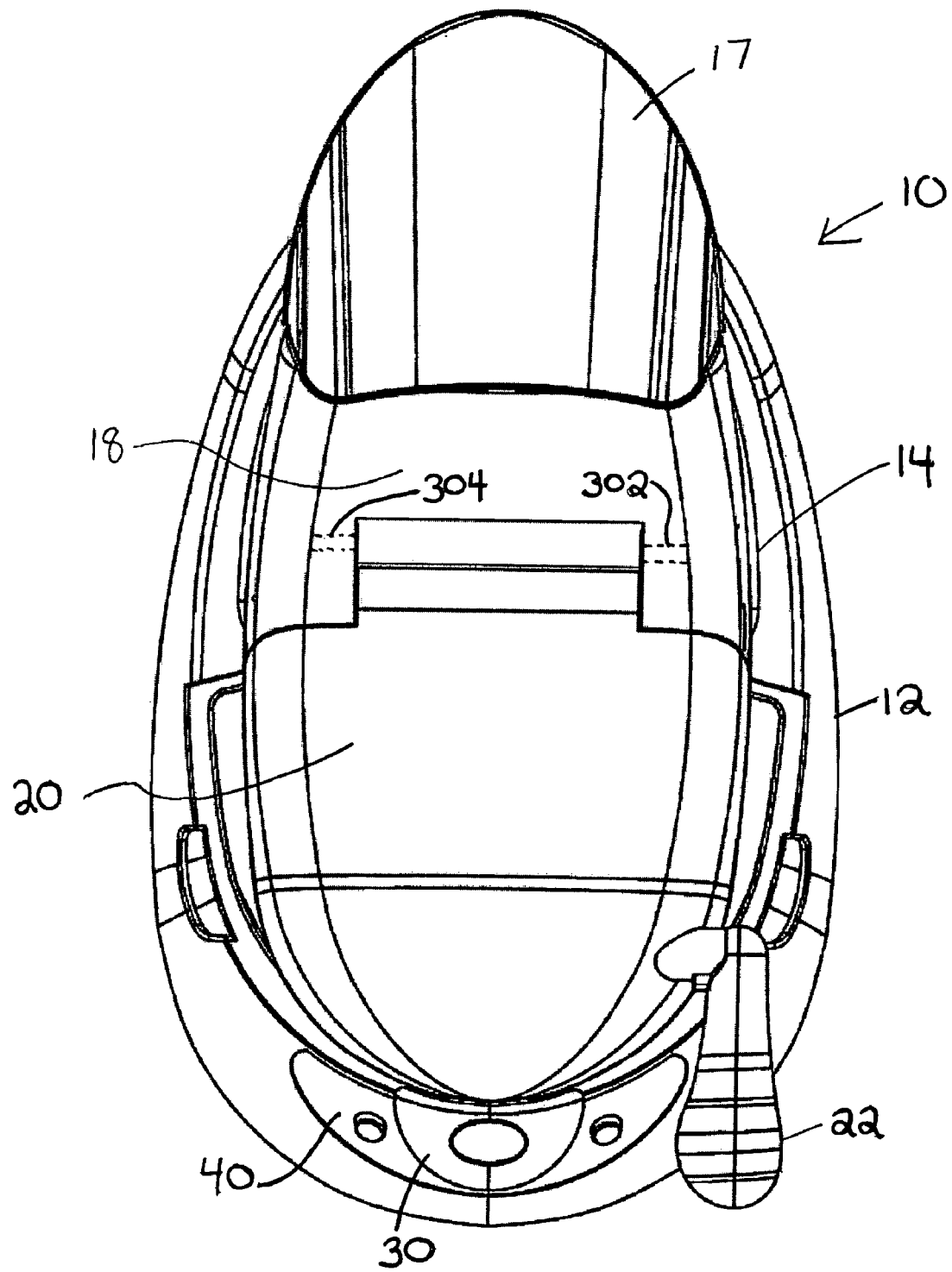
FIG. 3 is a top view of the coffee maker of FIG. 1.
Figure 4:
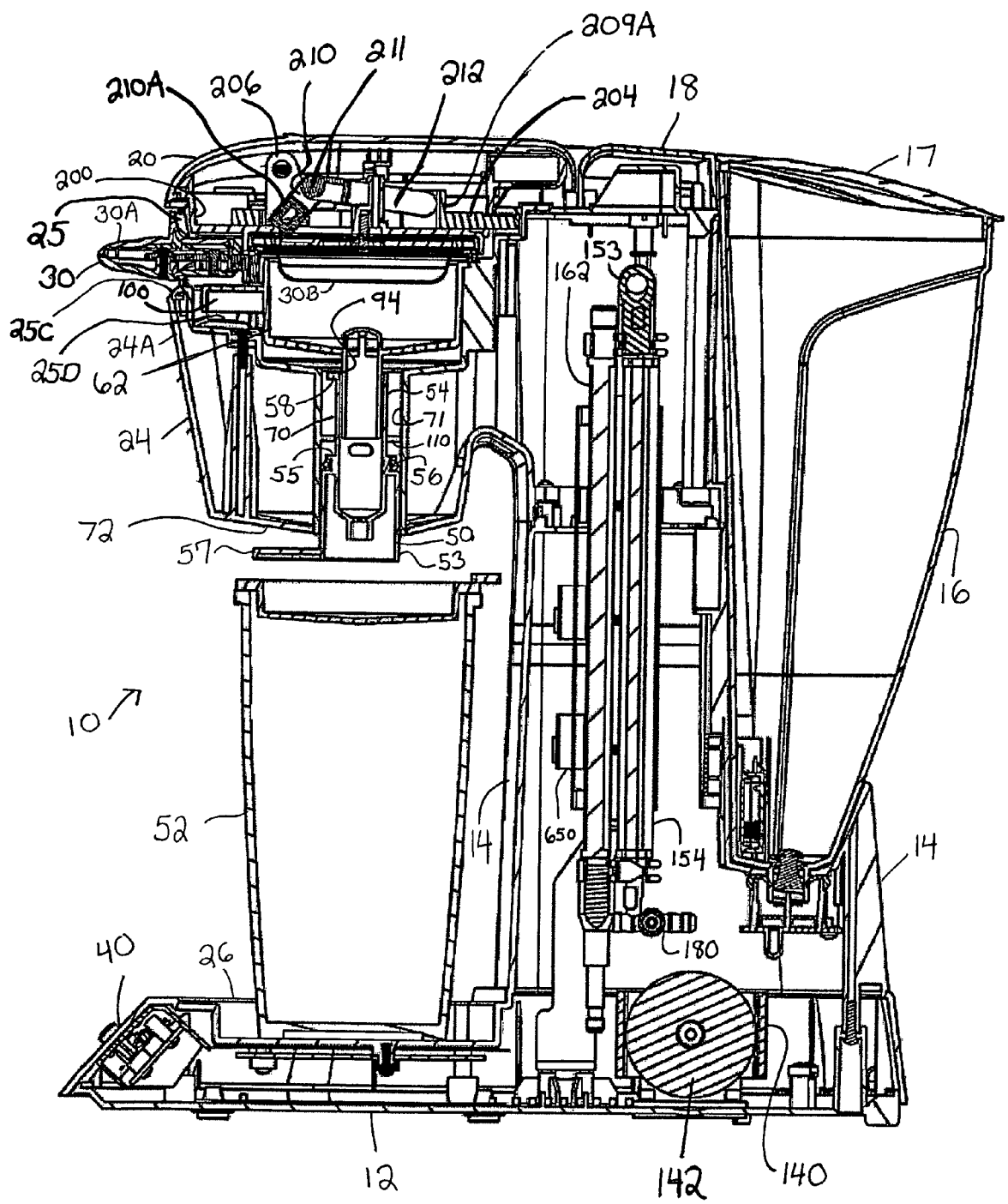
FIG. 4 is a cross-sectional view of the coffee maker of FIG. 1.

Referring to FIGS. 2 and 4, coffee maker 10 further includes spout 50 that extends from the bottom 72 of front housing section 24. Spout 50 is positioned over coffee cup 52 which is supported by drip tray cover 26. Spout 50 can be adjusted upward or downward to accommodate coffee cups of different heights. Spout 50 comprises lower section 53 and upper section 54. The diameter of the lower section 53 is greater than the diameter of upper section 54. This difference in diameters provides shoulder 55. Spout 50 includes a circumferentially extending groove located just below shoulder 55 and a friction ring 56 that is disposed within the circumferentially extending groove. Friction ring 56 can be fabricated from any suitable material that can provide friction when it contacts another surface. In one embodiment, friction ring 56 is made of rubber. Other suitable materials can be used as well. Spout 50 also comprises handle 57 which is attached to lower section 53. Spout 50 includes protrusion 58 that extends from upper section 54. The purpose of this particular structure of spout 50 is discussed in the ensuing description.

Figure 8:
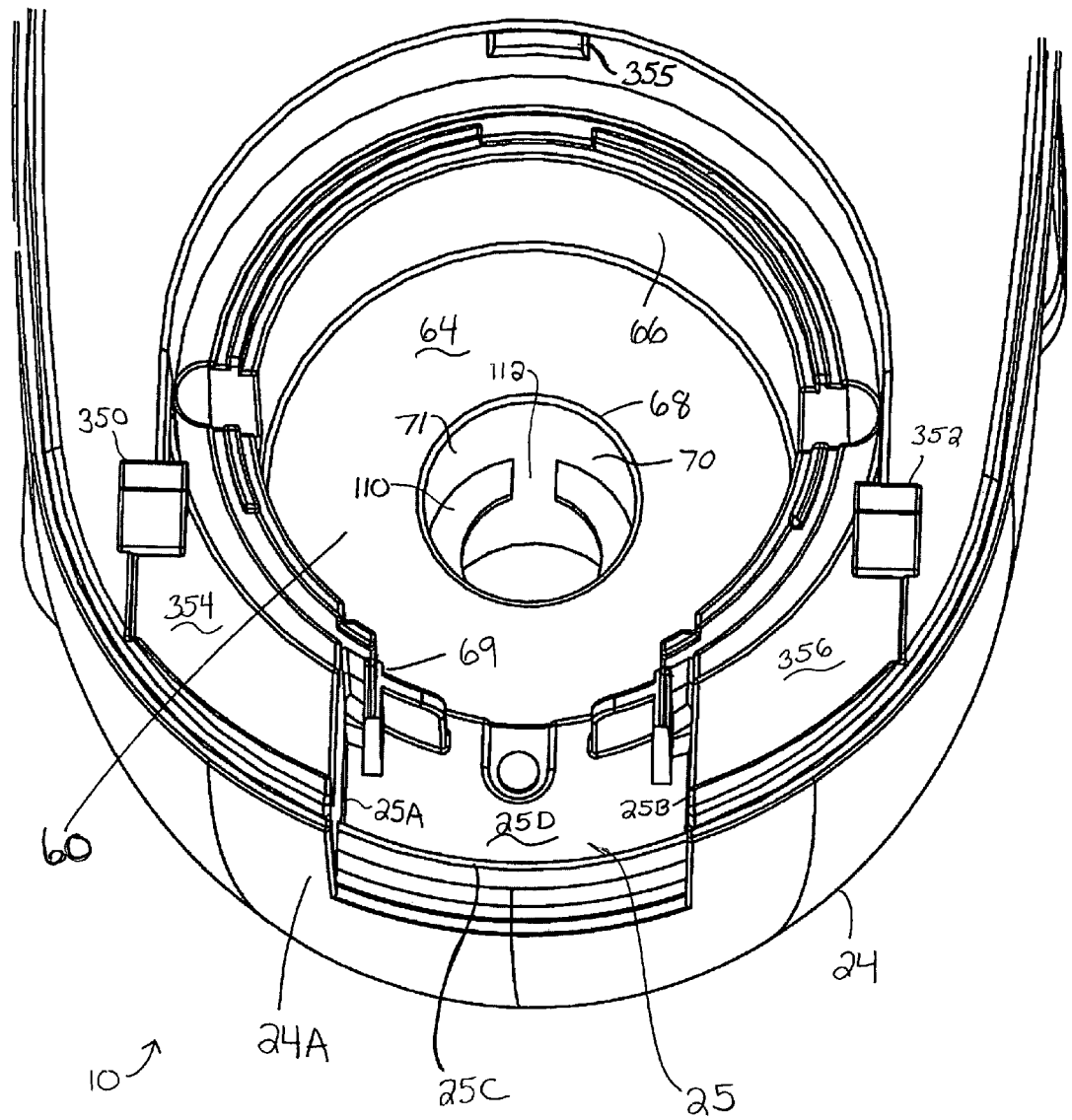
FIG. 8 is a perspective view of a funnel receiving space depicted in FIGS. 4 and 5.

Referring to FIGS. 1, 4 and 6-8, upper portion 24A of front housing section 24 has a notch or cut-out 25 therein. Notch 25 is bordered by side walls 25A and 25B and front edge 25C. Generally flat section 25D is sunken below front edge 25C as can be seen in FIGS. 4 and 8. Front housing section 24 further includes funnel receiving space 60 that is sized for receiving funnel 62. Funnel receiving space 60 is defined by a bottom surface 64 and circumferentially extending wall 66. Bottom surface 64 has an opening 68 that is communication with vertically oriented channel 70. Channel 70 has an inner wall 71. Channel 70 extends to bottom portion 72 of front housing section 24. Wall 66 has notch 69 (see FIG. 8) that is aligned with notch or cut-out 25 in upper portion 24A of front housing section 24.

Figure 9:
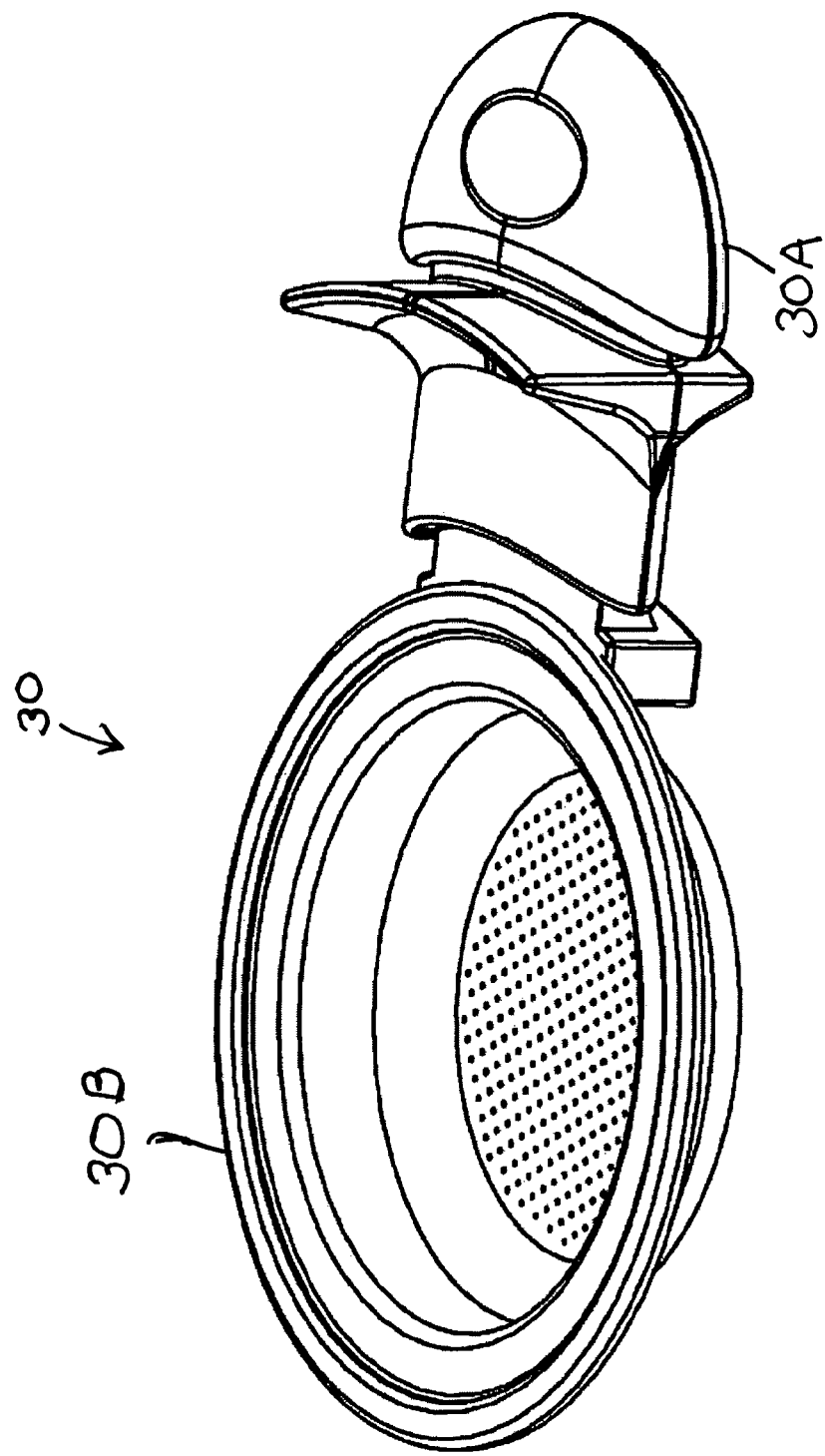
FIG. 9 is a perspective view of one embodiment of a coffee pod holder used in the coffee maker of the present invention.
Figure 10:
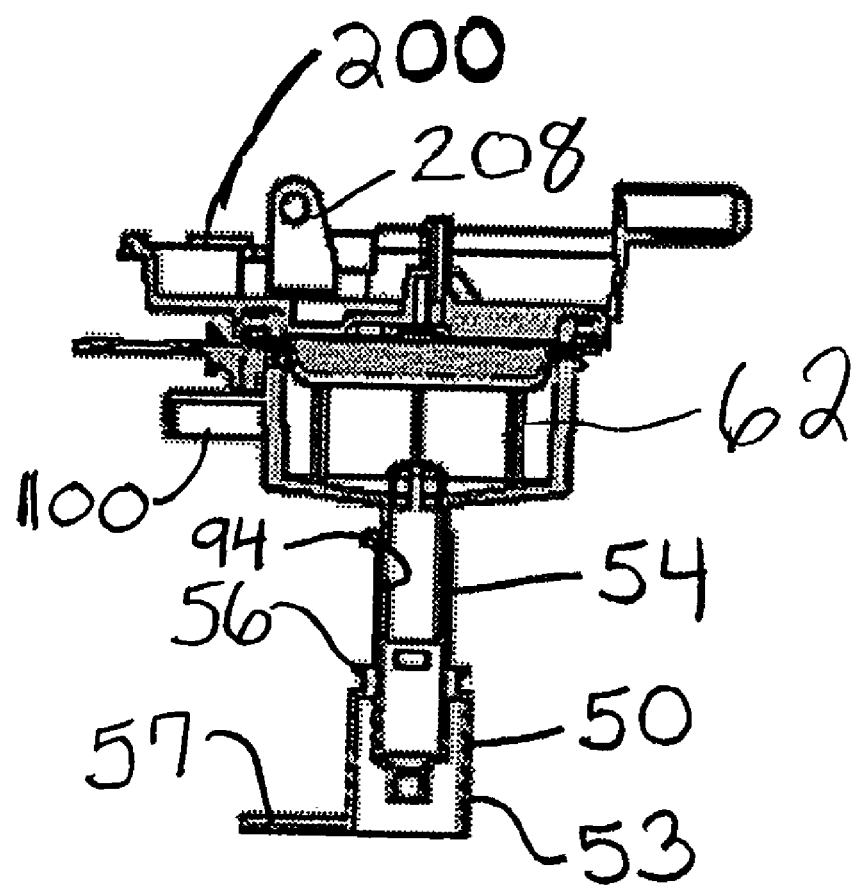
FIG. 10 is an elevational view showing the spout and funnel that are depicted in FIG. 4.

Referring to FIG. 9, coffee pod holder 30 comprises handle 30A and coffee pod holder section 30B. In one embodiment, coffee pod holder section 30B is sized to hold one coffee pod. In an alternate embodiment, coffee pod holder section 30B is sized to hold more than one coffee pod.

Referring to FIGS. 4 and 6-9, funnel 62 has circumferentially extending wall 80 and bottom surface 82 which cooperate to define interior region 84. Interior region 84 is sized for receiving coffee pod holder section 30B. Circumferentially extending wall 80 has notch 85 which is aligned with notch 69 in wall 66 (see FIG. 8). The purpose of notch 69 is discussed below in the ensuing description. Funnel 62 further includes opening 92 in bottom surface 82. Guard 93 is positioned over opening 92 and allows brewed coffee to flow therethrough. Funnel 62 further includes vertically extending conduit 94 that is communication with opening 92. The brewed coffee that drips down on bottom surface 82 flows into opening 92 and down conduit 94. When funnel 62 is positioned in funnel receiving space 60, conduit 94 is disposed in channel 70. Funnel 62 also includes horizontally extending stem 100 that protrudes through notch 69 in circumferentially extending wall 66 that surrounds funnel receiving space 60.

Referring to FIGS. 4, 6, 7 and 9, spout 50 is removably and slidably disposed within channel 70. Friction ring 56 is in constant contact with inner wall 71 of channel 70. Thus, there is a constant frictional relationship between friction ring 56 and inner wall 71. This frictional relationship does not prevent the movement of spout 50, but instead, allows spout 50 to be positioned at a desired position without spout 50 sliding or moving down on its own.

Referring to FIGS. 4, 6, 7 and 9, the diameter of vertically extending conduit 94 is configured so that it can fit inside upper section 54 of spout 50 when spout 50 is positioned in channel 70. Thus, coffee can travel through conduit 94 and into the interior of spout 50 without any leakage or spillage.

Referring to FIGS. 4 and 8, inner wall 71 of channel 70 has annular shoulder 110. Annular shoulder 110 has notch 112 therein that is sized to receive protrusion 58 on upper section 54 of spout 50. In order to secure spout 50 within channel 70 and ensure that spout 50 does not fall out of channel 70, spout 50 is inserted into channel 70 so that handle 57 faces housing 14 and protrusion 58 is aligned with notch 112 in annular shoulder 110. Once protrusion 58 passes through notch 112, the user then rotates spout 50 about 180 degrees so that handle 57 faces outward as shown in FIG. 4. Spout 50 has been moved downward to its maximum limit when protrusion 58 contacts annular shoulder 110. Thus, spout 50 is prevented from falling out of channel 70.

Figure 5:
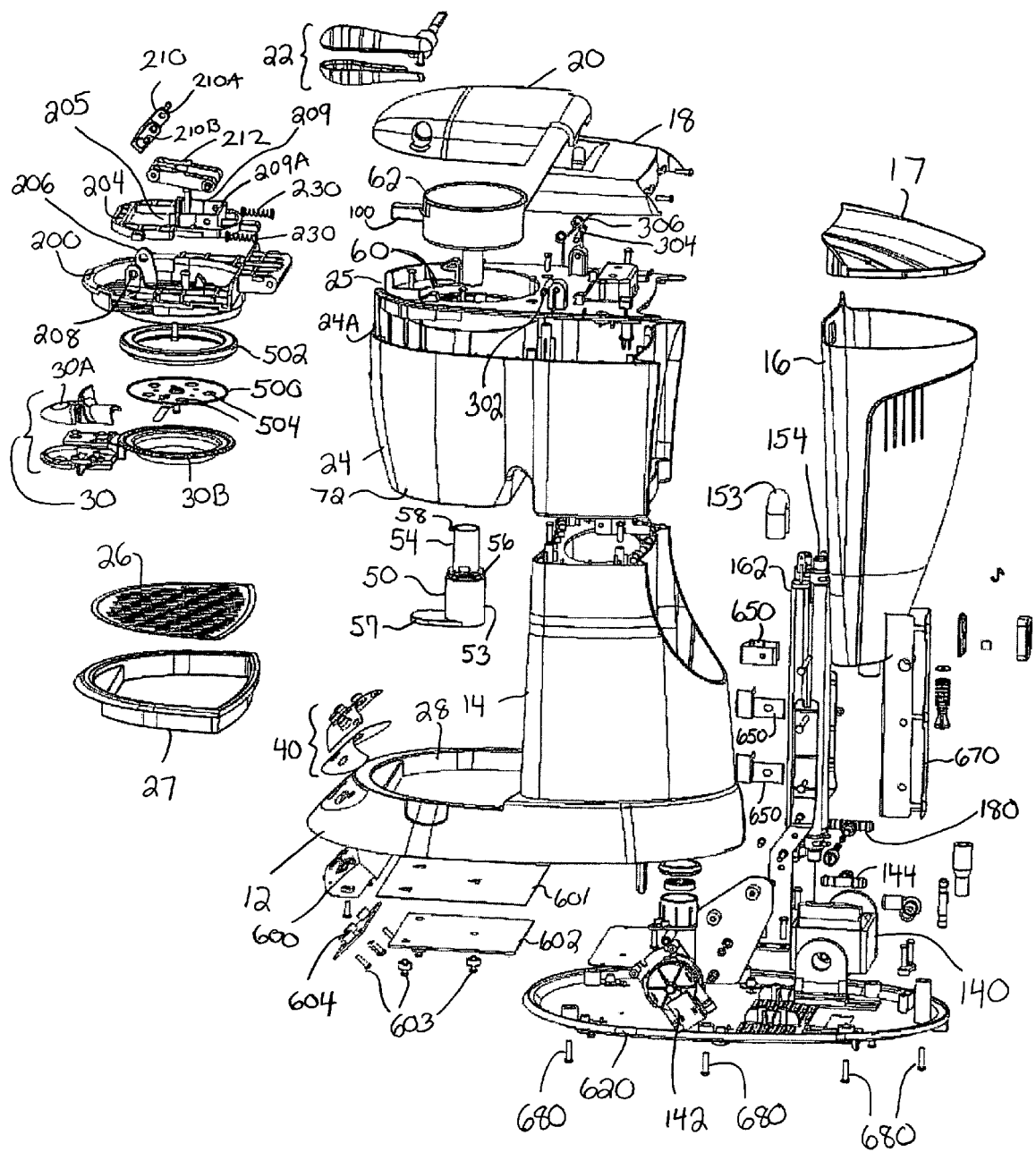
FIG. 5 is an exploded view of the coffee maker of FIG. 1.
Figure 6:
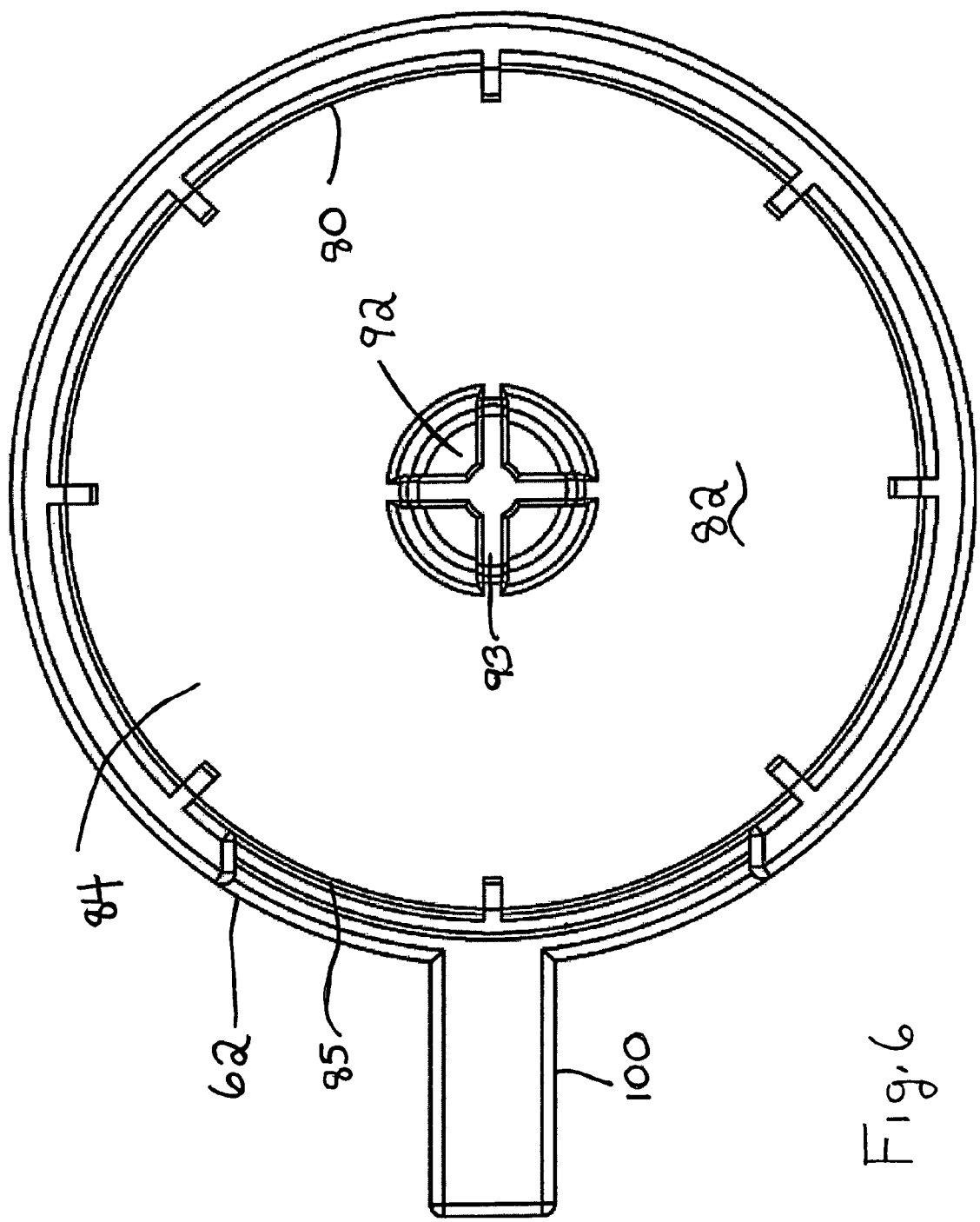
FIG. 6 is a top plan view of a coffee funnel depicted in FIGS. 4 and 5.
Figure 7:
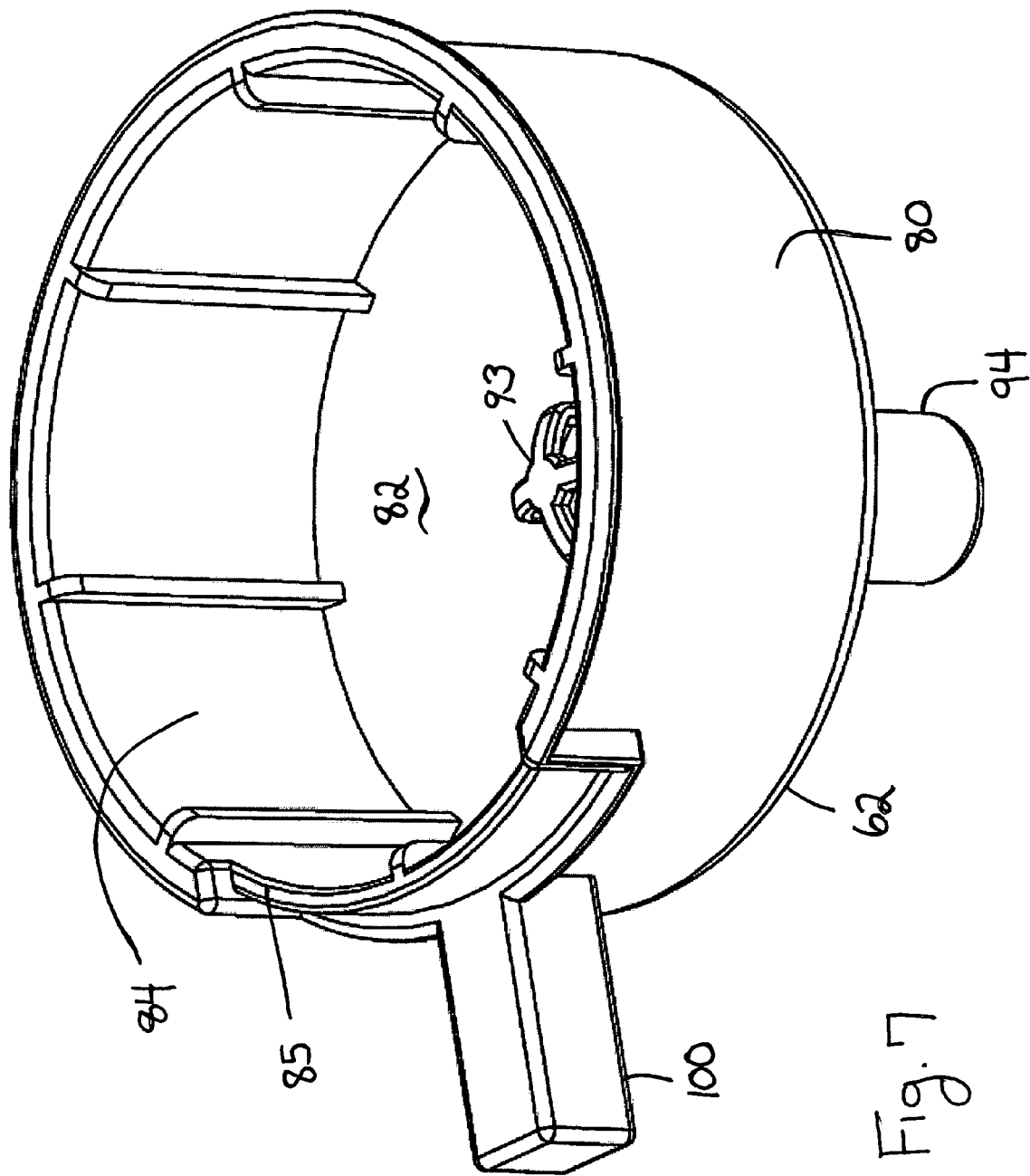
FIG. 7 is a perspective view of the coffee funnel of FIG. 6.
Figure 11:
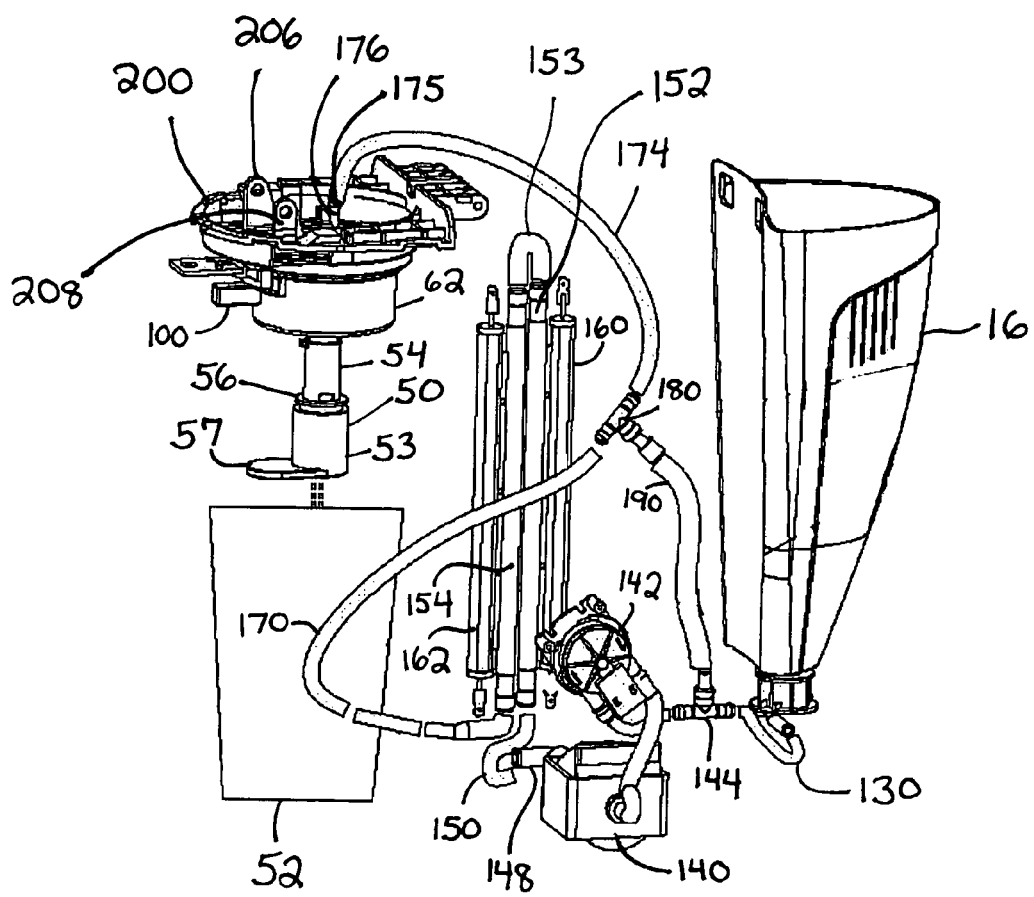
FIG. 11 is an exploded view of a system to pump and heat water, the system being depicted in FIGS. 4 and 5.
Figure 12:
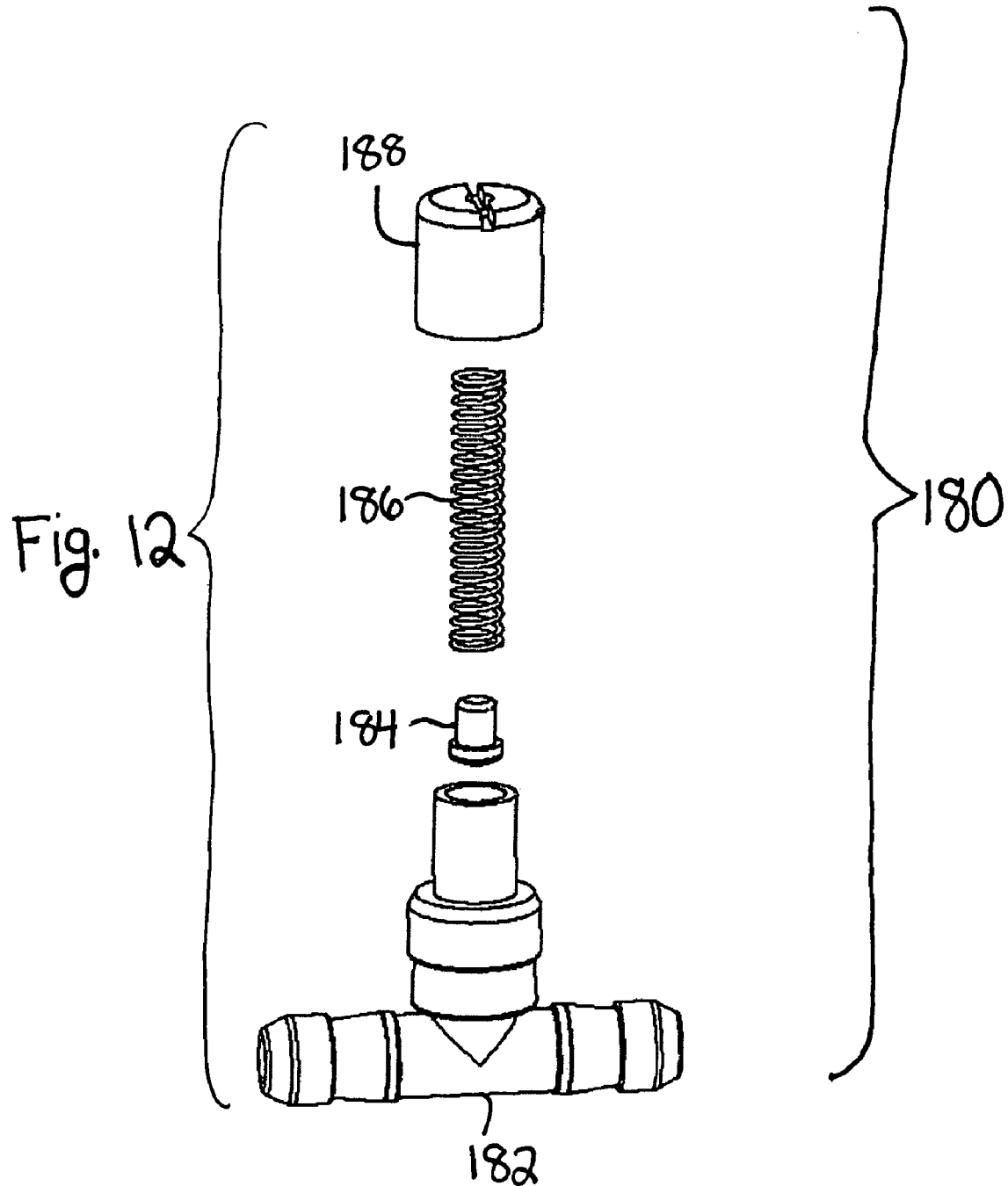
FIG. 12 is an exploded view of a pressure valve depicted in FIG. 11.
Figure 13:
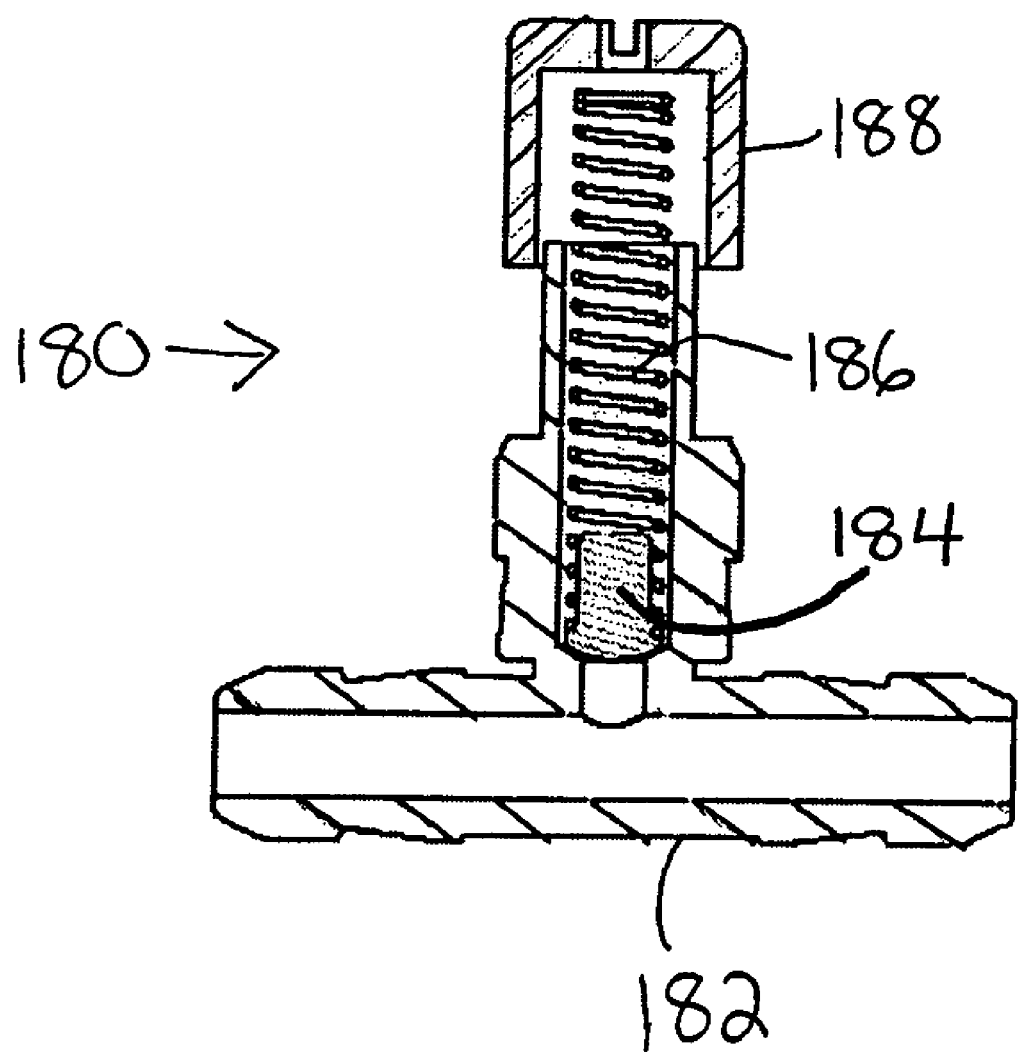
FIG. 13 is a side view, in cross-section, of the pressure valve of FIG. 12, the pressure valve being completely assembled.

Referring to FIGS. 4, 5 and 11, there is shown a system used by coffee maker 10 that stores water, pumps the water, heats the water and provides the heated water to the brewing chamber where the coffee is made. Reservoir or tank 16 stores an amount of water, e.g. six cups. Pump 140 pumps water from reservoir 16 causing the water to flow through flow meter 142 and into pump 140. As the water is pumped from reservoir 16, the water flows through conduit 130 and valve 144 before it enters flow meter 142. Pump 140 has an outlet 148 that is fluidly connected to conduit 150. Conduit 150 is fluidly connected to tube 152. Elbow conduit 153 fluid connects tube 152 to tube 154. Thus, water flows through conduit 150, tube 152, conduit 153 and tube 154. Tubes 152 and 154 are adjacent to each other. Heater element 160 is adjacent to tube 152. Heater element 162 is adjacent to tube 154. Therefore, as the water flows through tubes 152 and 154, the water is heated by heater elements 160 and 162. In a preferred embodiment, the heater elements 160 and 162 are fabricated from aluminum. Coffee maker 10 includes electrical circuitry 604 (see FIG. 5) and wiring (not shown) that powers heater elements 160 and 162. After the heated water exits tube 154, it flows through conduit 170. Conduit 170 can be configured as a flexible hose. The water flows through pressure valve 180 and into conduit 174. Conduit 174 includes water outlet 175 that is in fluid communication with water port 176. Water port 176 is attached to lid frame 200. Heated water exits water port 176 and contacts and permeates a coffee pod (not shown) that is disposed in coffee pod holder 30. The passing of the heated water through the coffee pod produces coffee which drops down to funnel 62. The coffee then passes through conduit 94 of funnel 62 and into spout 50. The brewed coffee flows from spout 50 into coffee cup 52. As a result of the operation of pump 140, the heated water is pressurized. Pressure valve 180 routes any excess pressurized heated water through conduit 190 and into valve 144. Referring to FIGS. 12 and 13, pressure valve 180 comprises "T" section 182, cork 184, three-pass valve spring 186 and valve cover 188. In one embodiment, cork 184 is configured as a silicone cork.

An advantage of the heating system shown in FIG. 11 is that the water can be heated to a relatively high temperature because the water first flows through tube 152 and is heated by aluminum heating element 160. This heated water then flows through tube 162 wherein it is heated again by aluminum heating element 162.

Referring to FIGS. 4, 5 and 11, coffee maker 10 utilizes electronic circuitry 604 and wiring (not shown) that are electrically connected to control panel 40, pump 140 and heater elements 160 and 162. A user can depress the appropriate buttons on control panel 40 to control pump 140 to pump an amount of water to produce the desired amount of coffee.

Figure 14:
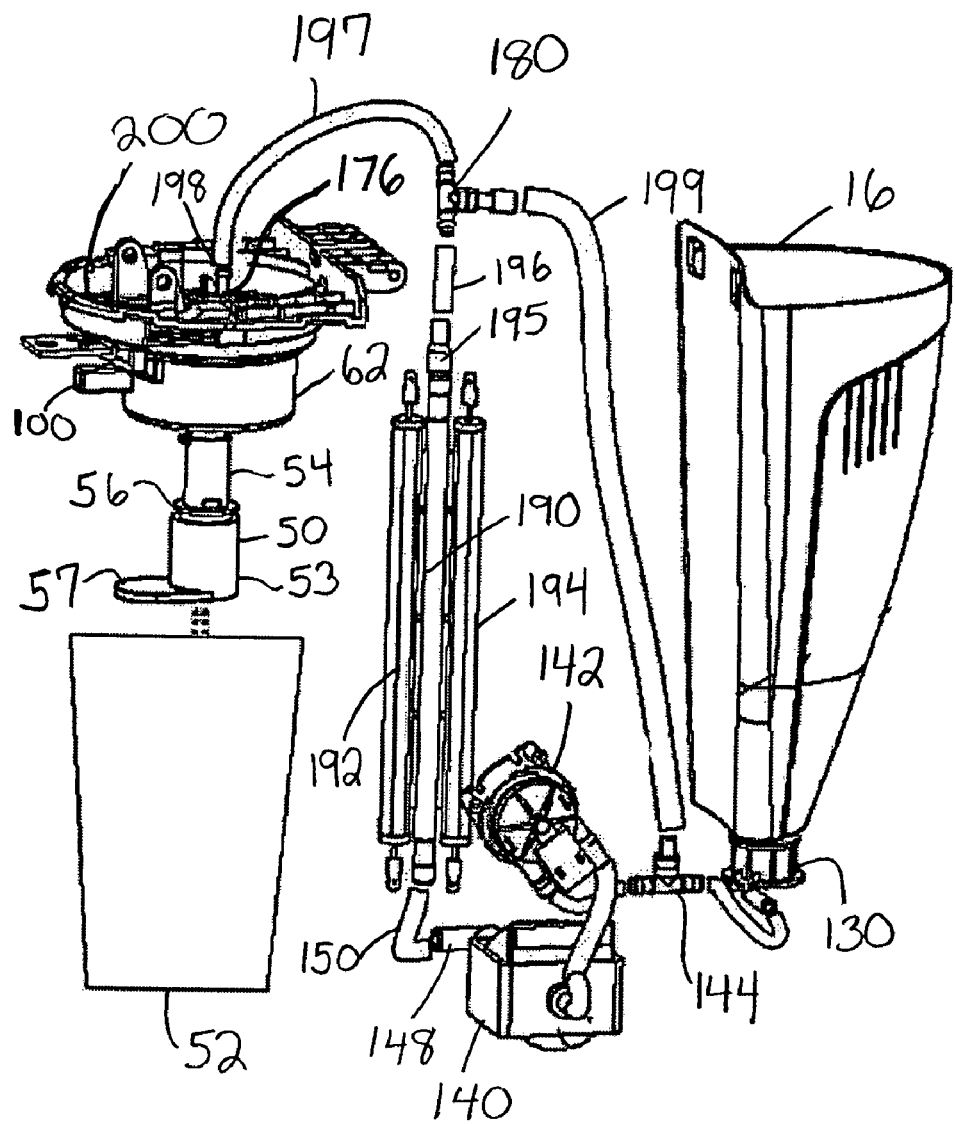
FIG. 14 is a diagram of another embodiment of a system to pump and heat water that can be used by the coffee maker of the present invention.

Referring to FIG. 14, there is shown an alternate embodiment of a water heating system that can be used in coffee maker 10. This alternate heating system comprises a single water tube 190 and a pair of aluminum heater elements 192 and 194. Water tube 190 is between heater elements 192 and 194. Conduit 150 is fluidly connected to tube 190 so that water flows from outlet 148 of pump 140 into tube 190. Tube 190 includes outlet 195 which is fluidly connected to conduit 196. Conduit 196 is fluidly connected to pressure valve 180. Pressure valve 180 is fluidly connected to conduit 197. Conduit 197 has outlet 198 that is in fluid communication with water port 176. Water port 176 is attached to lid frame 200 as described in the foregoing description. Therefore, water is outputted by pump 140 and then flows into tube 190. As the water flows through tube 190, it is heated by heating elements 190 and 192. The heated water exits tube outlet 195, flows through conduit 196, pressure valve 180, conduit 197 and into fluid port 176. The heated water then exits water port 176 and contacts and permeates a coffee pod (not shown) that is disposed in coffee pod holder section 30B of coffee pod holder 30 as described in the foregoing description. Pressure valve 180 functions in the same manner as described in the foregoing description. Pressure valve 180 routes excess pressurized heated water through conduit 199, through valve 144 and into reservoir 16.

Figure 18:
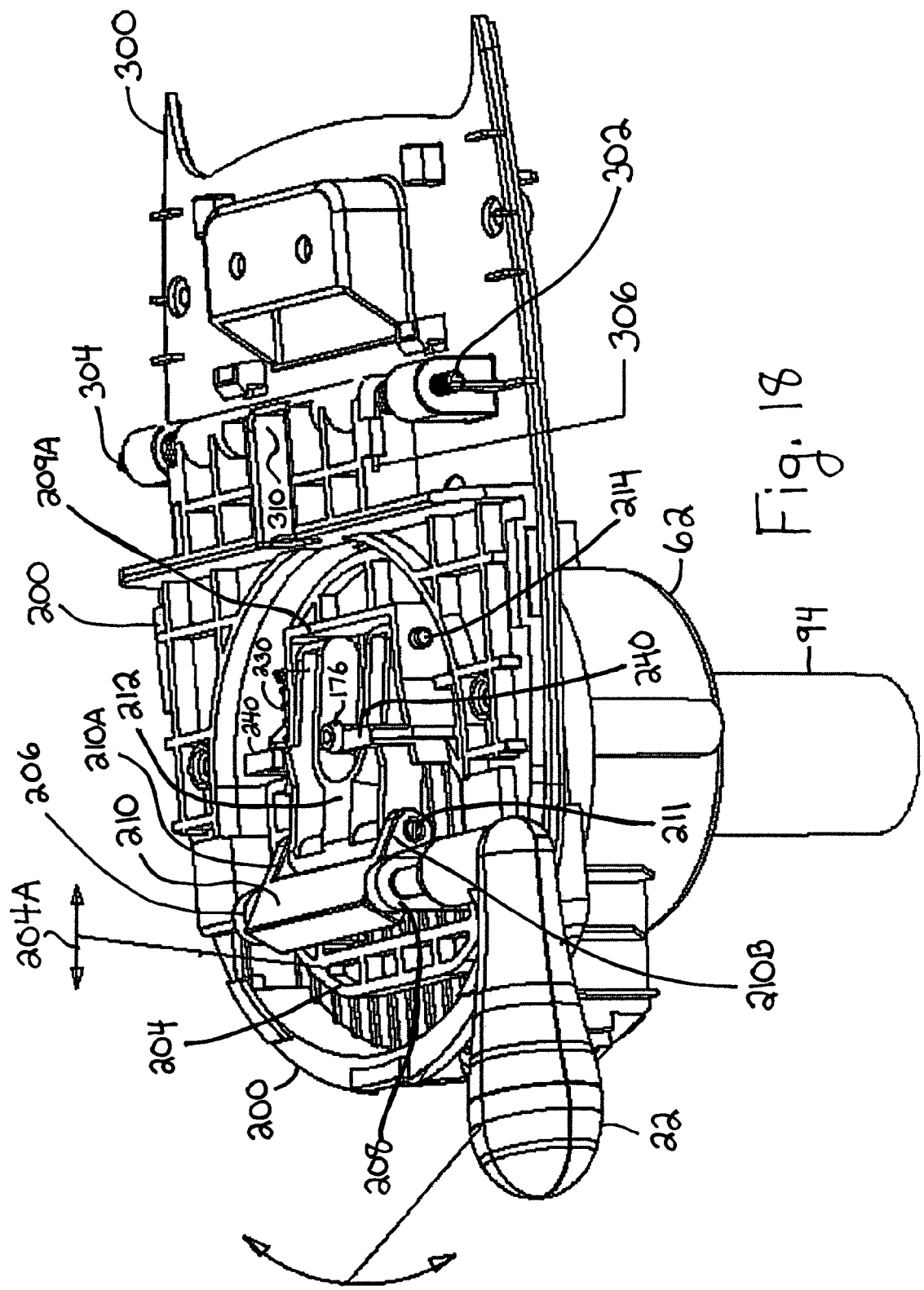
FIG. 18 is a partial view, in perspective, of the top portion of the coffee maker of FIG. 1, the cover not being shown in order to facilitate viewing of the lid locking device in the locked position.
Figure 19:
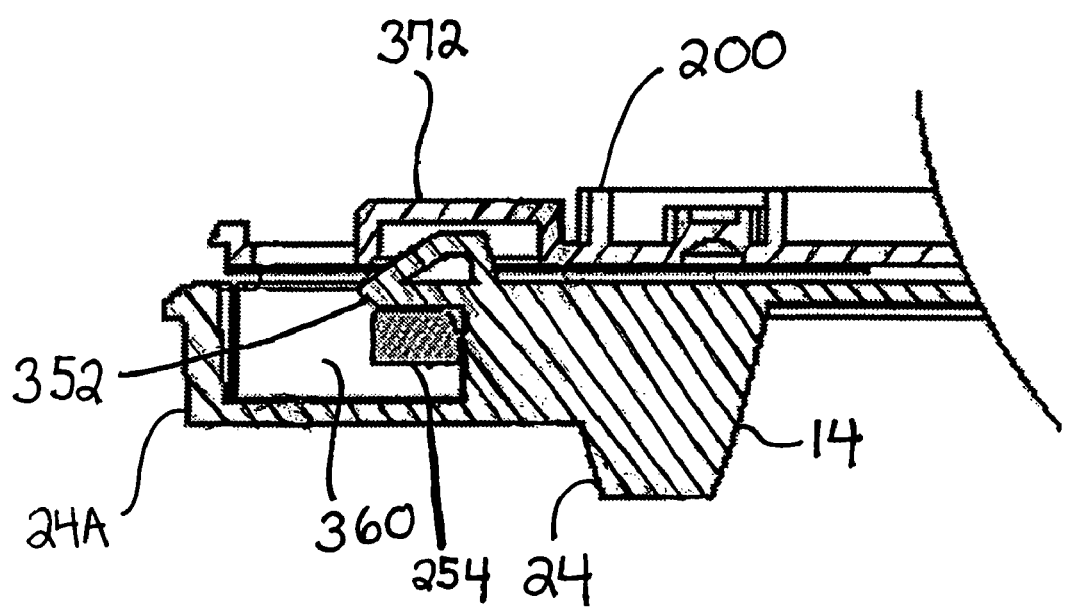
FIG. 19 is a partial view, in cross-section, showing the position of the engagement members when the lid locking device is configured in the locked position.
Figure 20:
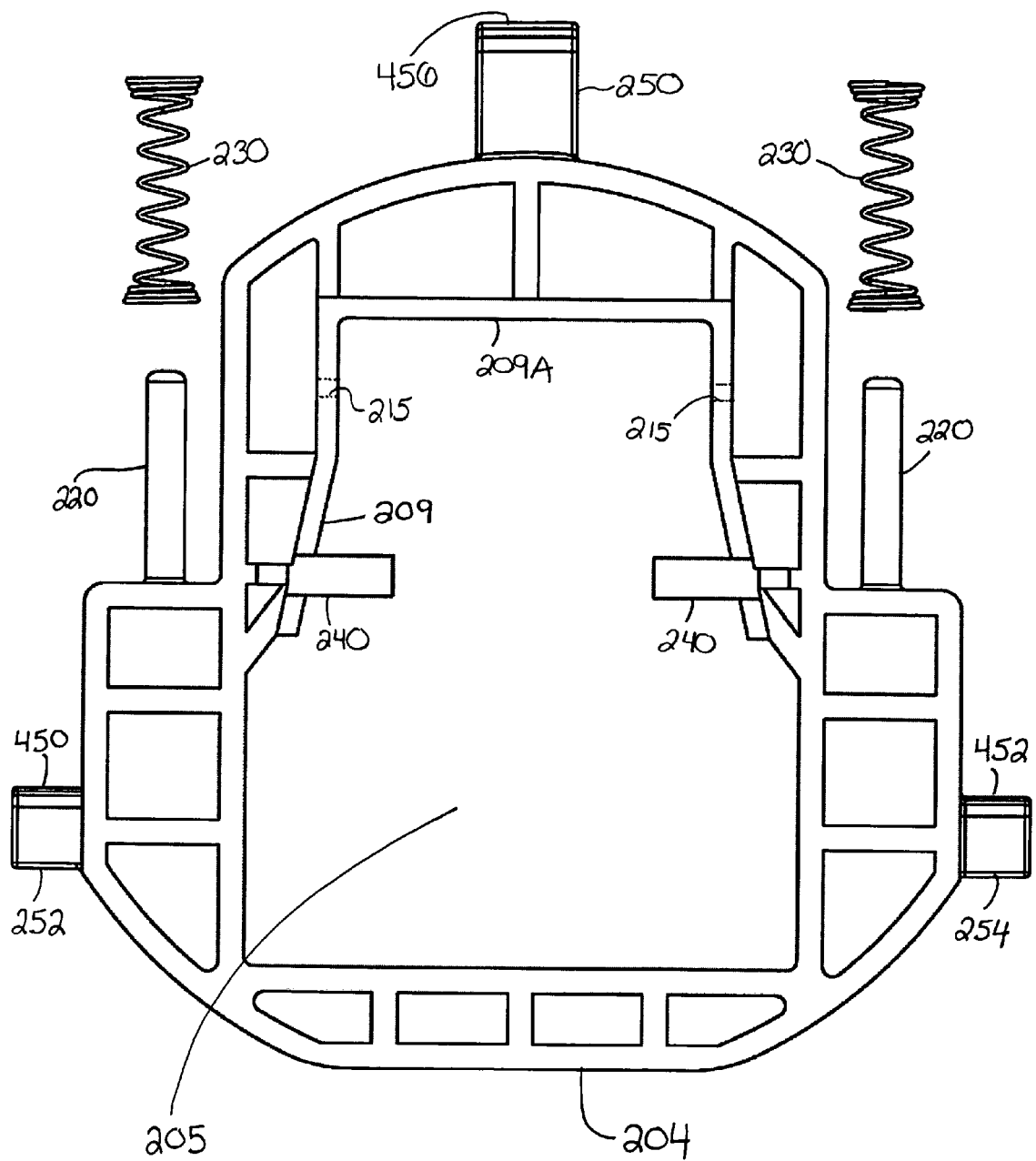
FIG. 20 is a plan view of a lock body depicted in FIGS. 4, 5 and 15-19.
Figure 21:
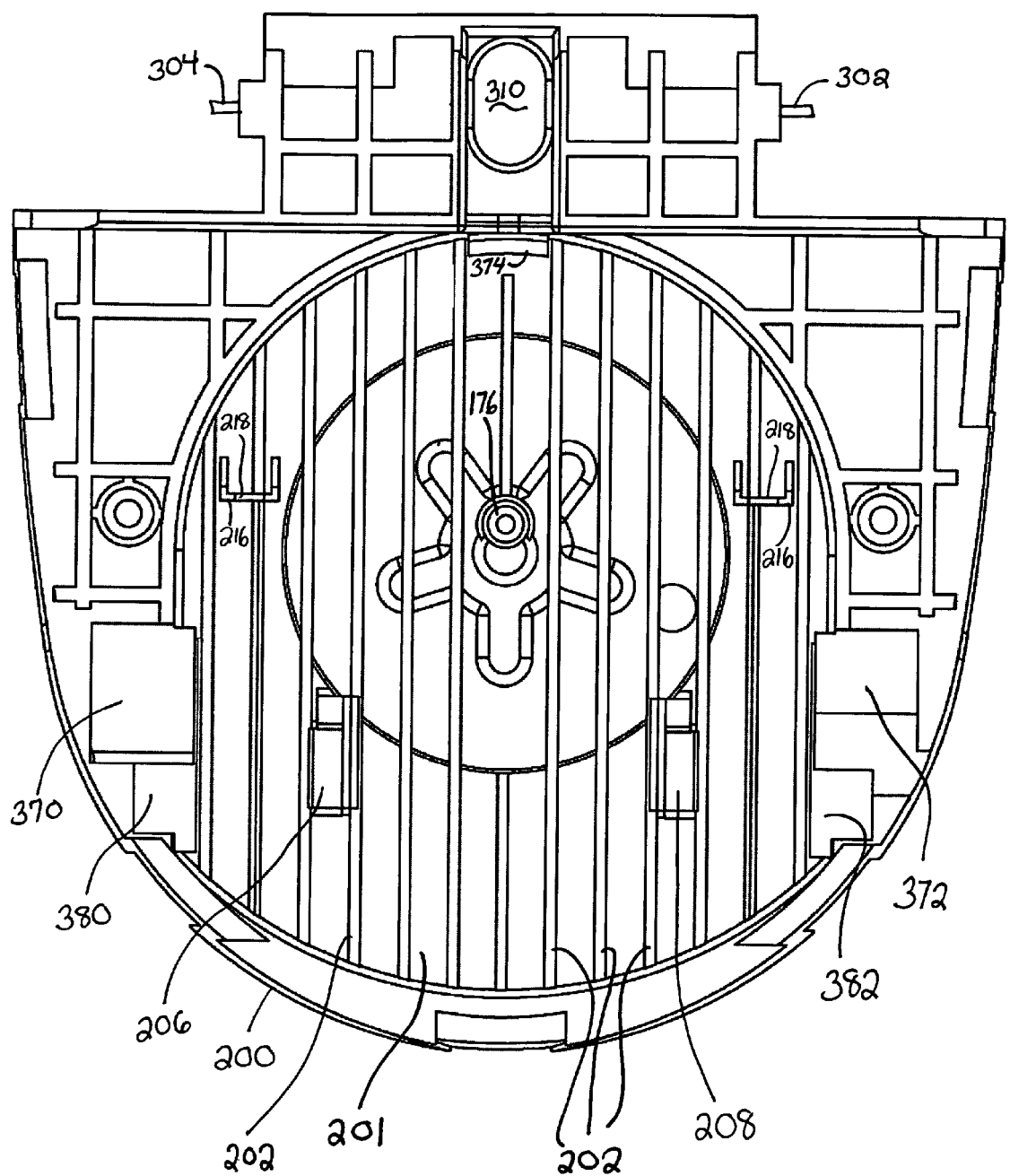
FIG. 21 is a plan view of the lid frame depicted in FIGS. 4, 5 and 15-19.

Referring to FIGS. 4, 5 and 15-21, lid 20 of coffee maker 10 comprises lid frame 200 and a lid locking device. The lid locking device is configured to lock lid frame 200 to the top of front housing section 24 so that the lid frame 200 is positioned over coffee pod holder 30. The lid locking device is also configured to release the lid frame 200 from the top of front housing section 24 so as to provide access to coffee pod holder 30. This enables lid 20 to pivot in the direction indicated by arrow 29 in FIG. 1. The lid locking device comprises lock body 204 that is movably positioned on top surface 201 of lid frame 200. Top surface 201 has a plurality of equidistantly spaced ribs 202 which add structural integrity to lid frame 200 and facilitate movement of lock body 204. Lock body 204 can move forward or backward, as indicated by arrow 204A (see FIG. 18), to an open position and to a locking position. The central portion of lock body 204 is cut-out to form opening 205. Lock body 204 has a wall 209 that partially extends about opening 205. Wall 209 has a rear section 209A. Lid frame 200 includes mounting posts 206 and 208 that are rigidly attached to lid frame 200. Lever 210 has arms 210A and 210B. As shown in FIGS. 4, 5, 17 and 18, lever 210 is pivotally mounted between posts 206 and 208. Handle 22 is attached to lever 210 so that pivoting handle 22 will pivot lever 210. Lever 212 is located within opening 205 of lock body 204. Lever 212 has one end that is pivotally mounted between arms 210A and 210B of lever 210 (see FIGS. 4, 5, 17 and 18) via pivot pin 211 and an opposite pivot pin (not shown). The opposite end of lever 212 is pivotally attached to rear section 209A of wall 209 by a pair of pivot pins, one of which being pivot pin 214, the opposite pivot pin not being shown (see FIG. 18). In one embodiment, the pivot pins (e.g. pivot pin 214) are attached to lever 212 and are disposed through openings 215 in wall 209 of lock body 204 (see FIG. 20). Lid frame 200 includes support posts 216 that are rigidly attached to lid frame 200 (see FIG. 21). Each support 216 has a notch 218 that is sized for receiving a corresponding horizontally extending stem 220 of lock body 204 (see FIGS. 20 and 21). A corresponding spring 230 is mounted on each stem 220. Each stem 220 is disposed in a notch 218 of a corresponding support post 216, and each spring 230 is mounted on a corresponding stem 220 so that the spring 230 is interposed between lock body 204 and a corresponding support post 216. Lock body 204 includes arms 240, the purpose of which is discussed in the ensuing description. Lock body 204 further comprises rear engagement member 250 and side engagement members 252 and 254. As shown in FIGS. 5, 18 and 21, lid frame 200 is pivotally attached to housing 14 via pins 302 and 304. Torsion springs 306 urge lock body 204 forward in the direction indicated by arrow 400 when lid frame 200 is in the open position (see FIG. 16). Lid 20 covers pins 320, 304 and torsion springs 306 (see FIGS. 1 and 5). As shown in FIG. 21, lid frame 200 has an opening 310 for receiving conduit 174.

Figure 16:
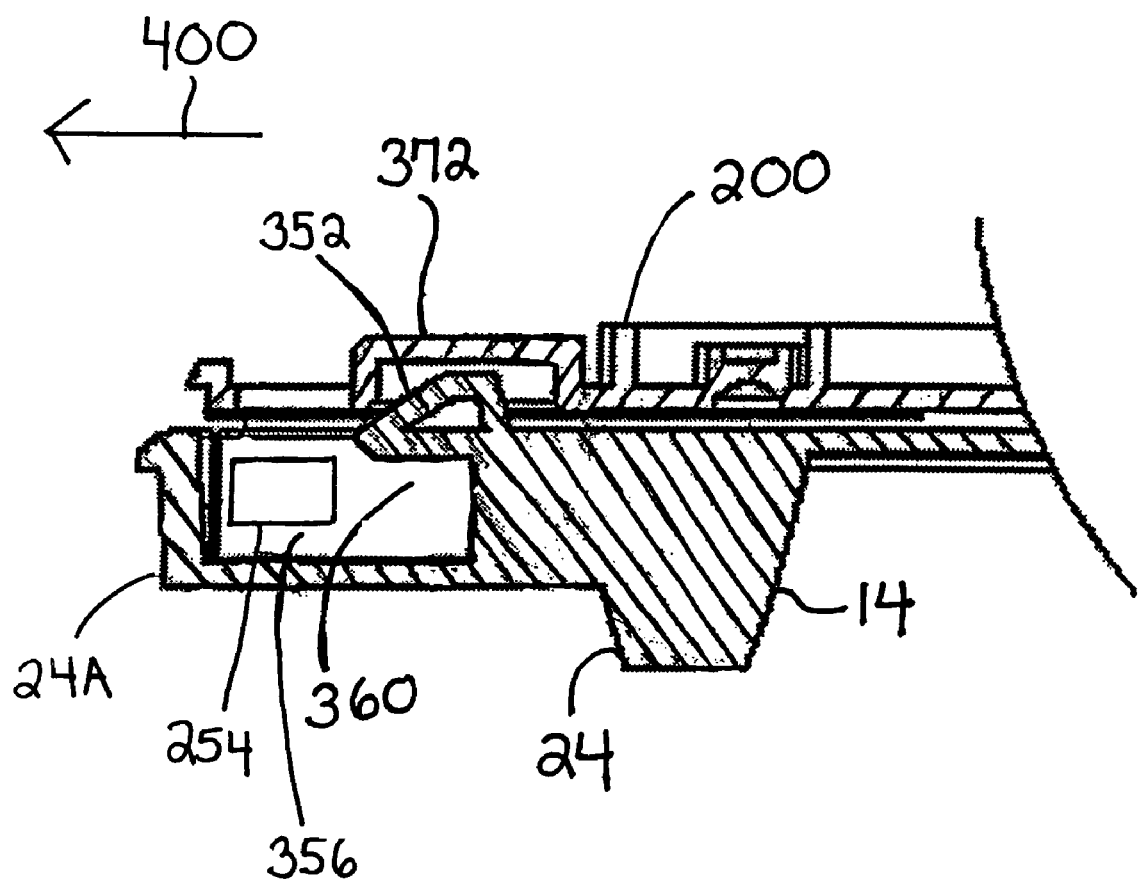
FIG. 16 is a partial view, in cross-section, showing the position of engagement members when the lid locking device is configured to release the lid so the lid can be opened.
Figure 17:
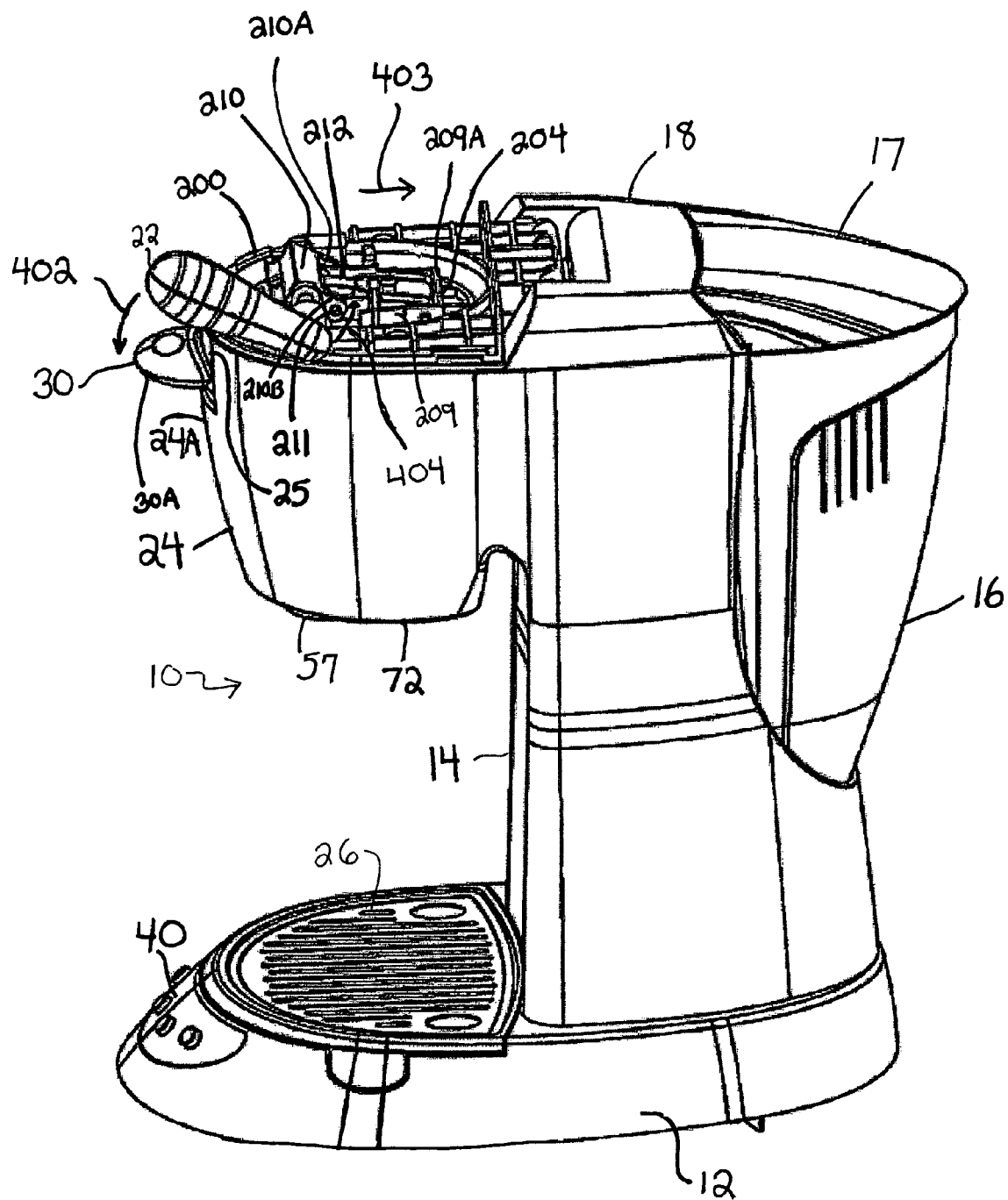
FIG. 17 is a perspective view of the coffee maker of FIG. 1 showing the lid locking device being configured into the locked position.

Referring to FIGS. 8 and 16, front housing section 24 includes complementary engagement members 350 and 352. Front housing section 24 includes recess 354 adjacent member 350 which provides a space under member 350. Similarly, front housing section 24 includes recess 356 adjacent member 352 which provides a space under member 352. Such spaces are sized so as to allow engagement members 252 and 254 to slide under complementary engagement members 350 and 352, respectively. For example, referring to FIG. 16, recess 356 provides space 360 under complementary engagement member 352. Referring to FIG. 21, lid frame 200 further includes sections 370 and 372 that are arranged so as to be positioned over complementary engagement members 350 and 352, respectively, when lid frame 200 is in the closed position. Lid frame 200 includes opening 380 that is in front of and extends under section 370. Opening 380 allows engagement member 252 to slide under complementary engagement member 350 when lid frame 200 is positioned as shown in FIG. 18. Similarly, lid frame 200 includes opening 382 that is in front of and extends under section 372. Opening 382 allows engagement member 254 to slide under complementary engagement member 352 when lid frame 200 is positioned as shown in FIG. 18.

When the lid frame 200 is not in the closed position, torsion springs 306 urge lid frame 200 open such that lid 20 is angulated with respect to housing cover 18. When a user desires to lock lid 20 to front housing section 24, the user pushes lid 20 downward so as to overcome the resistance of torsion springs 306 and so that lid frame 200 will contact the top portion of front housing section 24 and cover funnel 62, coffee pod holder 30 and the coffee pod therein. At this point, handle 22 is in the upright position shown in FIG. 15. When handle 22 is in the position shown in FIG. 15, springs 230 urge lock body 204 forward in the direction indicated by arrow 400 (see FIG. 16). As a result, engagement members 250 and 252 are positioned forward of complementary engagement members 350 and 352, respectively, as shown in FIG. 16. Thus, engagement members 250 and 252 are not engaged with complementary engagement members 350 and 352, respectively. Next, the user pivots handle 22 forward as indicated by arrow 402 in FIG. 17. As handle 22 is pivoted forward, lever 210 pivots and causes lever 212 to push lock body 204 in the direction indicated by arrow 403 in FIG. 17. As handle 22 is pivoted forward and lever 212 pushes the lock body 204 backward, lever 210 pulls one end of lever 212 upward as indicated by arrow 404 in FIG. 17 and as shown in FIG. 4. Arms 240 limit the range of upward movement of lever 212. As a result of the rearward movement of lock body 204, engagement members 252 and 254 become positioned under and engaged with complementary engagement members 350 and 352, respectively, and engagement member 250 is disposed through rear opening 374 in lid frame 200 (see FIG. 21) and into rear opening 355 (see FIG. 8) in the portion of housing 14 that is just above funnel receiving space 60. The complementary engagement members 350 and 352 are configured, sized and positioned so that engagement members 252 and 254 frictionally contact the surfaces of complementary engagement members 352 and 354, respectively. Similarly, rear opening 355 (see FIG. 8) is sized and positioned so as to create a frictional relationship between the perimetrical edge of opening 355 and engagement member 250. Preferably, engagement members 252 and 254 have beveled edges 450 and 452, respectively, to facilitate insertion of the members 252 and 254 under complementary engagement members 352 and 354, respectively. Similarly, engagement member 250 has beveled edge 456 to facilitate insertion of engagement member 250 through rear opening 355 (see FIG. 8) and rear opening 374 (see FIG. 21).

Figure 15:
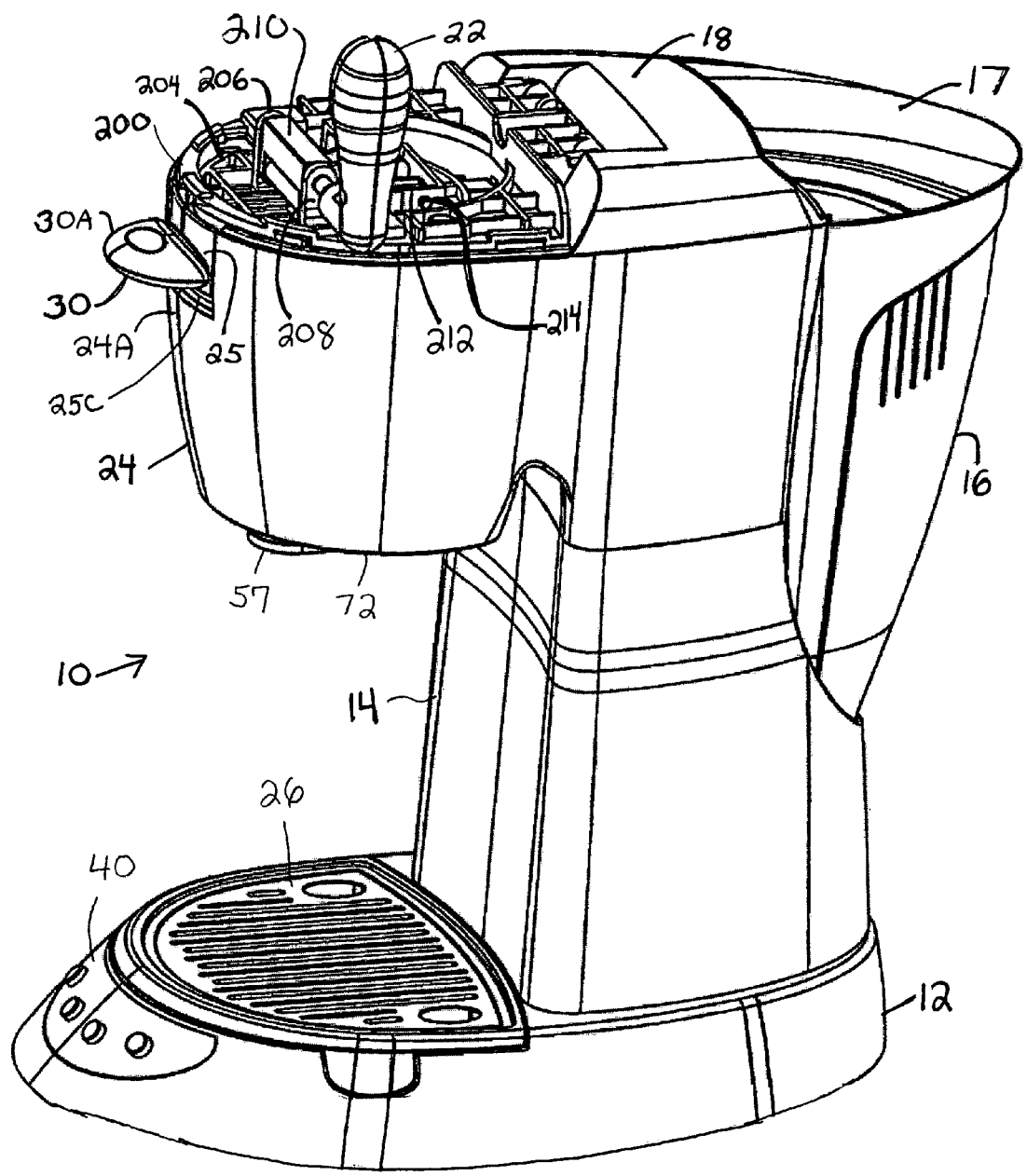
FIG. 15 is a perspective view of the coffee maker of FIG. 1 showing the lid locking device configured to release the lid so it can be opened.

When handle 22 is pivoted to the maximum limit as shown in FIG. 18, lid frame 200 is firmly locked to front housing section 24 and forms a seal over funnel receiving space 60 thereby forming a brewing chamber. In order to release and open lid frame 200, the user simply pivots handle 22 in the opposite direction so that it becomes positioned as shown in FIG. 15. As handle 22 is pivoted in the opposite direction (i.e. opposite to the direction indicated by arrow 402 in FIG. 17), engagement members 252 and 254 are withdrawn from under complementary engagement members 350 and 352, respectively, and engagement member 250 is withdrawn from opening 355 (see FIG. 8) and opening 374 (see FIG. 21). Consequently, torsion springs 306 urge lid 20 open. When lid 20 is open, the user can then remove the coffee pod, coffee pod holder 30 and funnel 62. Once the user removes these items, the user will have access to the funnel receiving space 60 as shown in FIG. 8.

Referring to FIGS. 4 and 5, lid frame 200 further comprises distribution disk 500 that is attached to the underside of lid frame 200, and radial seal 502 that extends about distribution disk 500. Distribution disk 500 has openings 504 that distribute heated water received from water port 176. When lid frame 200 is locked in the closed position, distribution disk 500 firmly presses against the coffee pod (not shown) that is positioned in coffee pod holder 30 and radial seal 502 forms a seal around the periphery of funnel 62 so as to create a brewing chamber. Heated water passes through openings 504 in distribution disk 500 and into the coffee pod (not shown) that is supported by coffee pod holder 30 so as to produce brewed coffee. The brewed coffee is dispensed through spout 50.

Referring to FIGS. 4 and 5, coffee maker 10 also includes brackets 600, support plates 600 and 601, and fasters 603 that retain and support electronic circuitry 604 and wiring (not shown) that is connected to control panel 40, heater elements 160 and 162, and other electrical components in coffee maker 10. In one embodiment, the electronic circuitry 604 is configured to provide a predetermined amount of time in which the aluminum heater elements 160 and 162 are preheated. After this predetermined amount of time has elapsed, the electronic circuitry 604 activates pump 140 to allow water to flow through tubes 152 and 154. Such electronics is known in the art and is therefore, not discussed in detail.

Referring to FIGS. 4 and 5, coffee maker 10 further includes support plate 620 that is located within base 12 and supports several of the components of coffee maker 10 including pump 140, flow meter 142, and the water heating system which comprises water tubes 152, 154 and heater elements 160 and 162. Mounting clips 650 and bracket 670 are used to mount the water heating system to housing 14. Fasteners 680 (e.g. screws) are used to assembly together all the aforesaid components.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not as limiting the scope and spirit of the invention as set forth in the attached claims.

What is claimed is:

1. A coffee maker comprising:
   a housing having a brewing chamber in which coffee is produced, the brewing chamber defining a funnel receiving space;
   a funnel positioned in the funnel receiving space;
   a water reservoir attached to the housing;
   a system to pump water from the reservoir, heat the water and then deliver the heated water to the brewing chamber, the system comprising:
      a pump for pumping water from the reservoir;
      a water heater for heating the water pumped from the reservoir, the water heater comprising a pair of heater members and a first conduit system adjacent to both heater members such that the pair of heater members heat the water flowing through the first conduit system;
      a second conduit system for delivering heated water to the brewing chamber; and
      a pressure valve to route excess pressurized heated water in the second conduit system back to the reservoir; and
   an adjustable spout movably secured to the housing for receiving the coffee produced in the brewing chamber, the adjustable spout being moveable upward and downward.

2. The coffee maker according to claim 1 wherein the spout comprises a handle that allows a user to adjust the position of the spout.

3. The coffee maker according to claim 1 further comprising a coffee pod holder removably positioned over the funnel and sized to receive at least one coffee pod.

4. The coffee maker according to claim 3 further comprising a lid moveable attached to the housing for covering the brewing chamber, the lid being moveable between a closed position that seals the brewing chamber and an open position that allows access to a coffee pod in the coffee pod holder.

5. The coffee maker according to claim 4 further comprising means for locking the lid in the closed position and releasing the lid.

6. The coffee maker according to claim 2 wherein the housing has a vertically oriented channel that extends downward from the brewing chamber and wherein the housing has an opening in communication with the vertically oriented channel.

7. The coffee maker according to claim 6 wherein the spout is movably positioned within the vertically oriented channel.

8. The coffee maker according to claim 7 further comprising means to removably secure the spout to the housing.

9. The coffee maker according to claim 7 wherein the funnel has an outlet disposed in the vertically oriented channel and in the spout so that brewed coffee in the funnel flows through the spout.

10. The coffee maker according to claim 6 wherein the spout comprises:
- a lower section having a first diameter, a first end from which brewed coffee exits and a second end that defines a shoulder, the handle of the spout being attached to the lower section;
- an upper section attached to the second end of the lower section such that the upper section is coaxially aligned with the second end of the lower section, the upper section having a second diameter that is smaller than the first diameter;
- said lower section having a circumferentially extending grove therein adjacent the second end; and
- a friction ring secured in the groove, the friction ring frictionally contacting the interior wall of the channel so that once the spout is moved to a desired position, it will remain there until a user moves it to a different position.

11. The coffee maker according to claim 1 wherein the first conduit system comprises a single tube.

12. The coffee maker according to claim 1 wherein the first conduit system comprises a pair of tubes.

13. The coffee maker according to claim 1 wherein the coffee pod holder is sized for holding at least one coffee pod.

14. The coffee maker according to claim 1 further comprising means for retaining the spout at a desired position.

15. The coffee maker according to claim 1 wherein the pair of heater members comprises aluminum heater elements to heat the water flowing through the first conduit system.

16. A coffee maker comprising:
- a housing having a brewing chamber in which coffee is produced, the brewing chamber defining a funnel receiving space, the housing including a vertical oriented channel that extends downward from the brewing chamber and wherein the housing has an opening in communication with the channel;
- a funnel positioned in the funnel receiving space;
- a coffee pod holder removably positioned over the funnel and sized to receive at least one coffee pod;
- a water reservoir attached to the housing;
- a system to pump water from the reservoir, heat the water and then deliver the heated water to the brewing chamber; and
- an adjustable spout movably secured to the housing for receiving the coffee produced in the brewing chamber, the adjustable spout having a handle and being moveable upward and downward; and said adjustable spout comprising:
- a lower section having a first diameter, a first end from which brewed coffee exits and a second end that defines a shoulder, the handle of the spout being attached to the lower section;
- an upper section attached to the second end of the lower section such that the upper section is coaxially aligned with the second end of the lower section, the upper section having a second diameter that is smaller than the first diameter;
- said lower section having a circumferentially extending groove therein adjacent the second end; and
- a friction ring secured in the groove, the friction ring frictionally contacting the interior wall of the channel so that once the spout is moved to a desired position, it will remain there until a user moves it to a different position.

* * * * *